Jan. 15, 1935.  C. H. CUNO ET AL  1,987,597
FLUID FILTERING APPARATUS
Filed Aug. 5, 1932   3 Sheets-Sheet 1
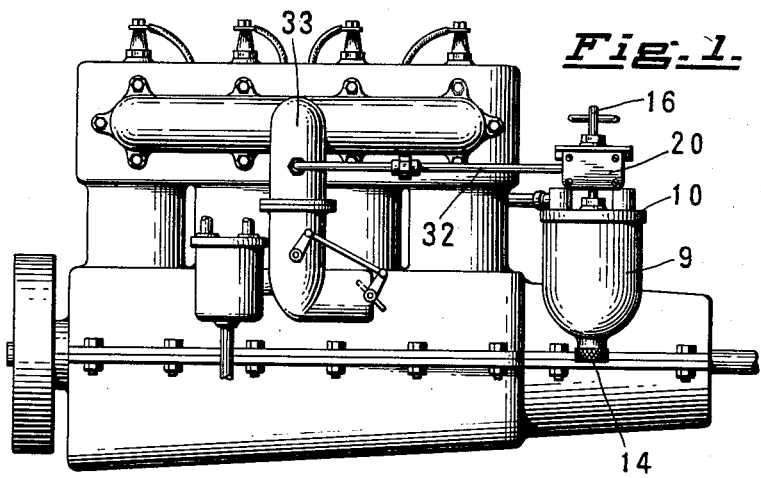
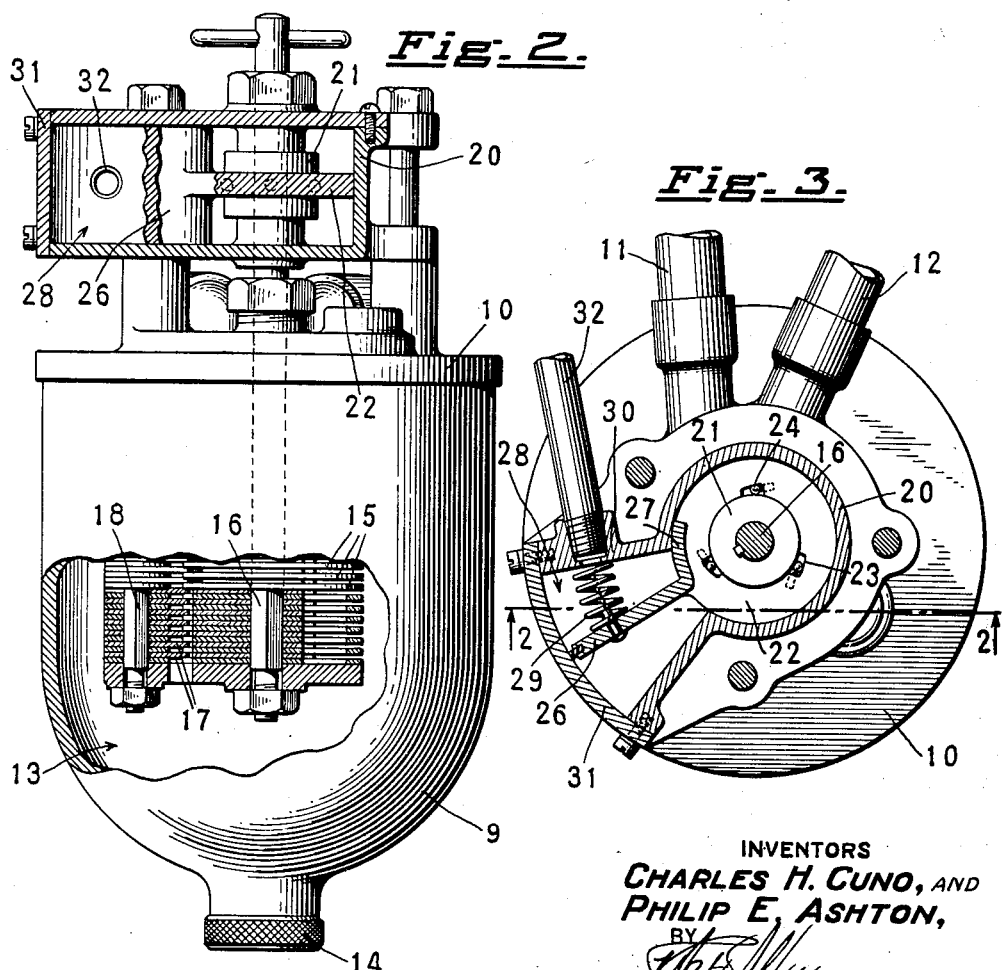
INVENTORS
CHARLES H. CUNO, AND
PHILIP E. ASHTON,
BY
ATTORNEY Jan. 15, 1935. C. H. CUNO ET AL 1,987,597
FLUID FILTERING APPARATUS
Filed Aug. 5, 1932   3 Sheets-Sheet 2
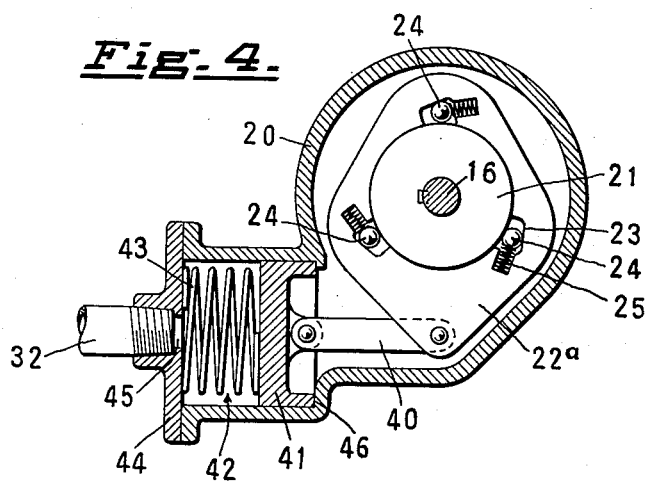
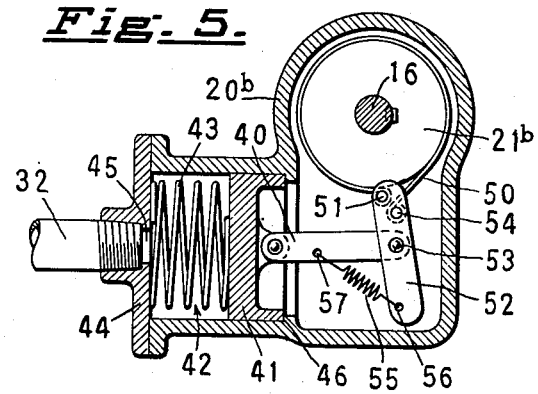
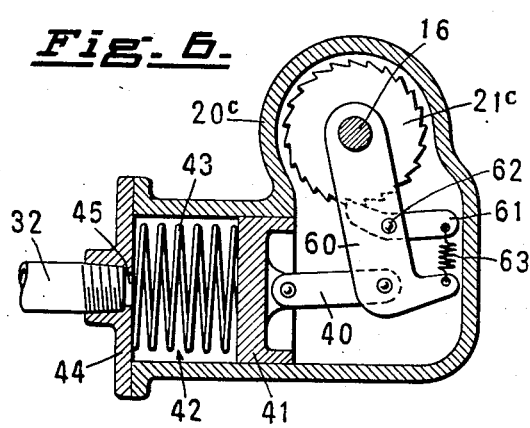
INVENTORS
CHARLES H. CUNO, AND
PHILIP E. ASHTON,
BY
ATTORNEY

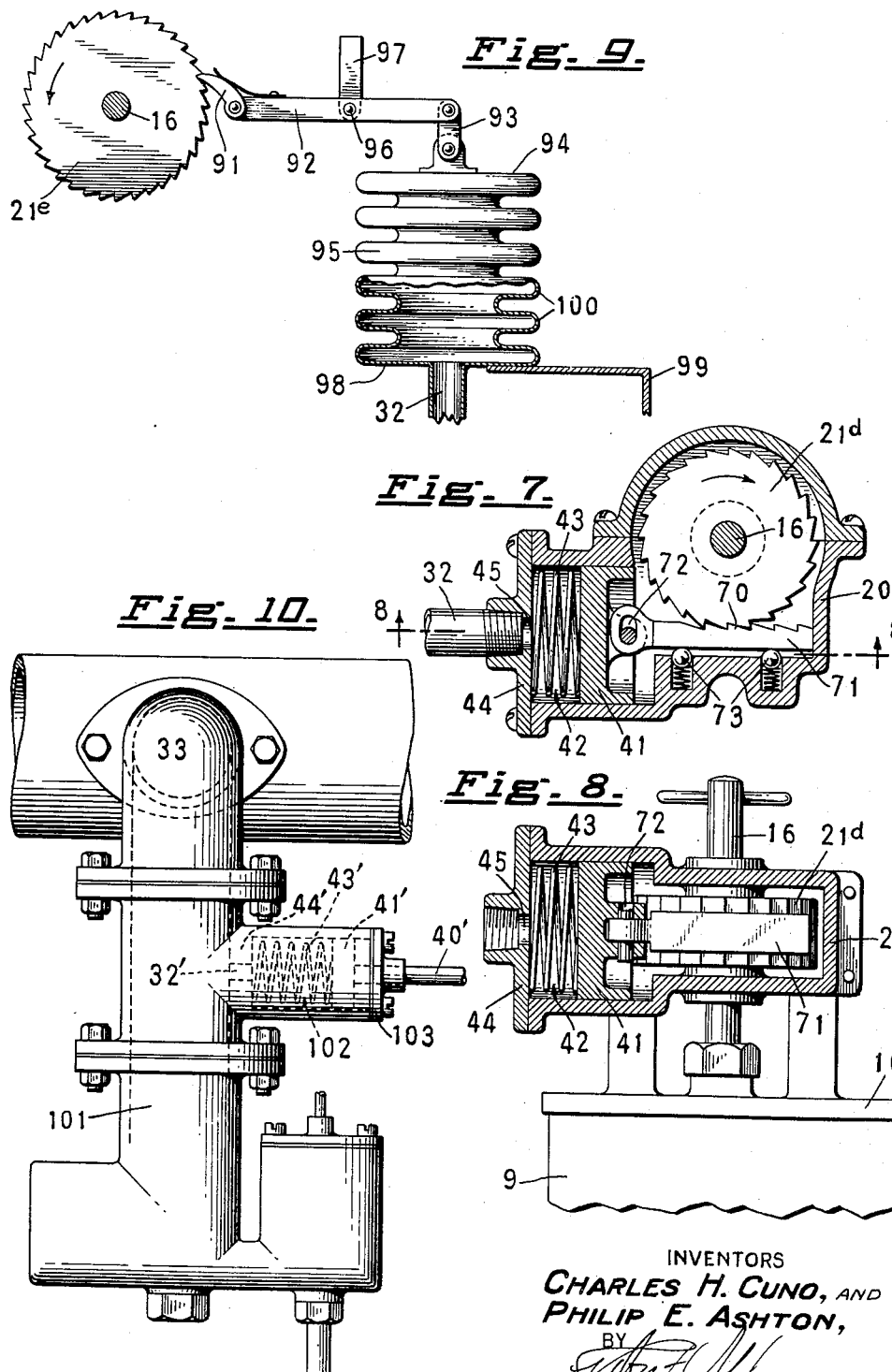

Patented Jan. 15, 1935

1,987,597

UNITED STATES PATENT OFFICE 1,987,597

FLUID FILTERING APPARATUS

Charles H. Cuno and Philip E. Ashton, Meriden, Conn., assignors to The Cuno Engineering Corporation, Meriden, Conn., a corporation of Connecticut Application August 5, 1932, Serial No. 627,546

7 Claims. (Cl. 210—167)

The necessity of providing filters or strainers for use in connection with an internal combustion engine is becoming more and more realized. Our invention relates particularly to filters or strainers employed on internal combustion engines for filtering or straining fluids in connection therewith.

Filters of the type shown in Cuno Patent 1,657,346 and Fulcher Patent 1,414,120 provide highly satisfactory means for filtering fluids under such circumstances. These filters may be used for filtering either the lubricating oil supply, the fuel supply, the cooling medium and any other fluid used in connection with an internal combustion engine. Naturally in the course of the use of such filters it becomes necessary from time to time to clean the filtering members. Such cleaning can be effected by producing relative movement between the filtering plates and the so-called scrapers. It is, of course, possible to effect this movement by hand but it is for obvious reasons in some cases desirable to provide for the automatic cleaning action either with or without means for manual operation.

We have discovered that a very simple device can be provided for automatically cleaning such a filter by means of suction or vacuum from the intake manifold of the engine.

When the engine is running there is, of course, a partial vacuum in the intake manifold, that is, there is a suction at this point which, however, varies materially under different running or operating conditions. When the engine is running wide open there is very little suction or vacuum. In face, the vacuum may amount to as little as 2" of mercury, whereas when the throttle is nearly closed there is a very high vacuum which may run as high as 18" to 20" of mercury.

We have accordingly designed a simple means for utilizing this variable condition for intermittently turning one of the elements of the filter.

Fig. 1 is a side view showing an internal combustion engine with a filter and actuating means connected to the intake manifold.

Fig. 2 is a side view and partial section showing the filter and actuating mechanism embodying our invention, being a section on the line 2—2 of Fig. 3.

Fig. 3 is a horizontal section and plan view of the parts shown in Fig. 2.

Figs. 4, 5, 6 and 7 are detail sectional views showing other modified forms of the device for actuating such a filter.

Fig. 8 is a transverse sectional view of Fig. 7 approximately on the plane of the line 8—8.

Fig. 9 is a plan view of another modification of the device partially broken away.

Fig. 10 is an elevation of an engine intake connection illustrating a modification of the power unit of this device.

Our invention also covers devices for automatically cleaning filters on internal combustion engines for such purposes as lubricating oil, fuels, cooling mediums and any other fluids used in connection with internal combustion engines.

In its preferred form the filter comprises a casing 9 with a head 10. These parts will usually be detachably connected together for convenience in installation, inspection and repair. The casing 9 has a chamber 13 through which the fluid to be filtered passes. Such a casing also forms a sump having an outlet cap 14.

The filter proper in its preferred form consists of a series of perforated plates 15 spaced apart from each other and supported on a central shaft 16. The fluid to be filtered passes usually inward between the peripheries of these plates and outward longitudinally of the axis in the manner set forth in the Cuno Patent 1,657,346 and the Fulcher Patent 1,414,120. Scraping fingers 17 are mounted on a post 18 and are adapted to project into the spaces between the filter plates so that when the filter plates are rotated with respect to the stationary scrapers material which is collected on or near the edges of the plates will be scraped off and fall down into the bottom of the casing.

The housing 20 surrounds one end of the shaft 16 and the shaft is provided with a hub 21 within the housing and surrounded by a disc 22, which is mounted to oscillate back and forth about the hub. This disc is provided with one or more notches with inclined walls 23.

Balls or rollers 24 are pressed by springs 25 into the spaces between the inclined walls 23 and the outer periphery of the hub 21 so that when the disc 22 is rotated clockwise the balls or rollers 24 wedge into the spaces between the outer wall of the hub 21 and the inclined walls 23 so that the rotation of the disc 22 is transmitted to the hub 21 and the shaft 16 of the filter plates. When the disc 22 rotates counter-clockwise the balls or rollers 24 tend to work back and no motion is transmitted from the disc 22 to the shaft 16.

Within the housing is mounted a plate or vane 26 which extends radially from the disc 22 and has a wall 27 which fits within the housing 20 so as to provide a chamber 28 which is substantially air-tight. A spring 29 tends to press the plate 26 away from the wall 30 into a position such that the balls or rollers 24 are released and the shaft 16 is free to be turned by hand if desired. The outer end of the chamber 28 is closed by a plate 31 suitably held in position.

A pipe 32 connects the housing 20 with the intake manifold 33 of the internal combustion engine.

Referring to Fig. 3, when the engine is not running there is no vacuum in the inlet manifold 33, pipe 32 or chamber 28 so that the pressure of the spring 29 holds the vane 26 away from the wall 30 and against the opposite inner face of the wall 20. If the engine is started with the throttle fully open, a low degree of vacuum is produced in the inlet manifold 33, pipe 32 and chamber 28 which is insufficient to overcome the effect of the spring 29, and no motion of the apparatus occurs.

When the operator of the engine decreases the throttle opening while the motor is running, the vacuum in the inlet manifold 33, pipe 32 and chamber 28 is temporarily increased and when the suction exerted thereby on the left face of the vane 26, as shown in Fig. 3, is sufficient to overcome the pressure of the spring 29, the vane moves to the left or clockwise, compressing the spring.

This motion of the vane carries the plate 22 with it in a clockwise direction and the balls or rollers 24 pressed by the springs 25 roll inwardly between the hub 21 and the sloping walls 23 until they are wedged against the hub and act as a one-way clutch so that the hub and shaft 16 rotate with the plate. The shaft being thus turned causes a relative motion between the filter plates 15 and the scraping fingers 17 which removes accumulated dirt from between the plates and allows it to fall to the bottom of the filter casing 9.

As the throttle is opened again the vacuum in the intake manifold 33, pipe 32 and chamber 28 decreases and when the suction is no longer great enough to overcome the spring 29 the vane 26 is pushed by the spring in a counter-clockwise direction carrying the plate and clutch parts with it and allowing the hub and shaft to remain in their advanced position, the vane coming to rest against the wall 20 as previously described.

These movements are repeated intermittently during the operation of the engine whenever conditions demand changes of throttle opening of sufficient magnitude to affect the intake manifold vacuum in the manner outlined above. Obviously the spring and clutch could be so designed that suction would compress the spring and release the clutch and the spring when released would rotate the shaft.

The filter may also be cleaned by rotating the shaft 16 by hand. When the clutch member is arranged as shown in Fig. 3, this rotation would be made in a clockwise direction so that the balls or rollers would not bind on the hub.

In the form shown in Fig. 4 the plate 22ᵃ is connected by a link 40 to a piston 41 which has reciprocating motion in a cylinder 42 against a spring 43 and cylinder head 44. The cylinder head has an opening 45 to which the end of the pipe 32 is attached. When the vacuum is low in the pipe 32 the spring 43 holds the piston 41 against the shoulder 46 in the position shown and the hub and shaft are free to be rotated manually in a clockwise direction if desired. When the vacuum rises to a point where the force of the spring is overcome the piston moves toward the left and the link causes the plate 22ᵃ to rotate about the hub 21 when the one-way clutch action takes place and causes the movement of the shaft 16 as previously described.

In the form shown in Fig. 5 the hub secured to the shaft 16 is extended to form a cylindrical drum 21ᵇ which is surrounded by the strap or band 50. One end of this band is secured to a bearing post 51 fixed near the end nearer the drum 21ᵇ of a lever 52 which is hinged to the lever 40 at 53. The other end of the band is secured to a bearing post 54 fixed to the lever 52 between the post 51 and the hinge 53. That end of the lever 52 which is away from the drum is constrained to move in a clockwise direction under the tension of a spring 55 fastened at 56, the other end of which is secured to the lever 40 at 57.

As long as the vacuum is low in the pipe 32 the parts remain in the position shown and the shaft and drum are rotatable manually in a clockwise direction within the band which is held loosely against the drum by the action of the spring 55.

When the vacuum in the pipe 32 is increased sufficiently to move the piston to the left as before, the lever 40 moves the hinge 53 in a clockwise direction about the shaft 16 and assisted by the spring 55 tends to decrease the angle between the posts 51 and 54 with respect to the axis of the shaft 16. As this angle decreases the inside circumference of the band 50 is contracted into frictional engagement with the outer surface of the drum 21ᵇ which occurs very shortly after the piston starts and during the remainder of the piston movement the shaft, drum and band are turned together in a clockwise direction. When the vacuum is again reduced the piston moves to the right as before, and the hinge 53 rotates counter-clockwise about the shaft axis, causing the angle between the pins 51 and 54 with respect to the shaft axis to increase, thus lengthening the inside circumference of the band and freeing it from engagement with the drum, whereupon the shaft and drum remain in their advanced position and the band slips back around them until the piston comes to rest against the shoulder 46 and the lever 52 is returned to the position shown, ready for the next cycle of operation.

Fig. 6 illustrates a further modification in which the hub 21ᶜ has ratchet teeth formed on its periphery set to receive clockwise impulses. The shaft 16 carries the ratchet toothed hub 21ᶜ and is connected to the link 40 by an L-shaped link 60, the side extension of which acts as a stop against the wall of the casing 20ᶜ to arrest movement of the piston 41 caused by the spring 43.

A pawl 61 is pivoted at 62 to the link 60 in engagement with the ratchet teeth or the hub under the action of the spring 63 by which the outer end of the pawl is secured to the side extension of the link 60. Under low vacuum in the pipe 32 the parts remain as shown and the shaft may be rotated manually in a clockwise direction as the pawl slips over the ratchet teeth. When the vacuum is raised the piston moves to the left and the link 60 rotates about the axis of the shaft 16 in a clockwise direction carrying the pawl and engaged ratchet hub, thereby rotating the shaft 16. When the vacuum is again lowered the piston moves to the right and as the link rotates counter-clockwise about the shaft, the pawl slips over the ratchet teeth, leaving the hub and shaft in their advanced position.

Figs. 7 and 8 illustrate another form utilizing a ratchet hub 21ᵈ, the teeth of which are engaged by a toothed rack 70 formed on one side of an arm 71, one end of which is hinged to the piston 41 with a loose pin opening 72 which allows the arm to reciprocate in a transverse plane with respect to the axis of the shaft 16. The other end of the arm 70 acts as a stop against the wall of the casing 20ᵈ to arrest movement of the piston 41 caused by the spring 43. The rack and ratchet are held in engagement by spring pressed balls 73 mounted in recesses in the wall of the casing and acting against the arm 71 on the side opposite the rack.

Under low vacuum in the pipe 32 the parts remain as shown and when the vacuum is raised the piston moves to the left carrying the arm 71 and the rack 70 which, in engagement with the ratchet teeth on the hub 21ᵈ, rotates the shaft 16 in a clockwise direction. When the vacuum is again lowered the piston moves to the right carrying the arm 71 which depresses the balls 73 as the rack teeth slip over the ratchet teeth leaving the hub and shaft in their advanced position. The shaft may be manually rotated in a clockwise direction during which the rack 70 will move away from the ratchet teeth on the hub.

In the form shown in Fig. 9 the shaft 16 has a ratchet toothed flanged 21ᵉ which is in engagement with a pawl 91 carried at one end of a lever 92. The opposite end of the lever is connected by a link such as 93 with the free end 94 of a collapsible chamber or bellows 95. The lever 92 is fulcrumed at some point such as 96 to a fixed support 97 which may be suitably carried by the filter body. The pawl 91 may be pressed toward the ratchet 21ᵉ by a suitable spring.

The end 98 of the bellows 95 opposite the link 93 is secured to a fixed support shown diagrammatically at 99 and has an opening in communication with the pipe 32.

The sides of the bellows 95 may be made of some resilient metal with annular corrugations such as 100 which will permit the ends 94 and 98 to move towards each other as the vacuum in the pipe 32 increases and move apart again under the resilient action of the corrugated metal when the vacuum decreases, or the sides may be made of some other material such as rubber, fabric, leather or the like and have a spring under compression carried between the ends of the bellows to provide expanding action.

With the device in this form an increase in the vacuum in the pipe 32 causes the bellows to be compressed towards the fixed support 98 under atmospheric pressure exerted on the outside of the free end 94, and causes the link 93, the lever 92 and the pawl 91 to rotate in a clockwise direction about the fulcrum 96. The pawl is held in engagement with the ratchet teeth on the hub 21ᵉ and causes it to rotate in a counter-clockwise direction, carrying with it the shaft 16.

When the vacuum in the pipe 32 is again decreased the resilient member between the ends of the bellows causes the free end 94 to overcome the external atmospheric pressure and move away from the fixed end 98 and reverse the motion of the link 93, lever 92 and pawl 91 so that the pawl slips back over the teeth on the ratchet 21ᵉ. In this form manual rotation of the shaft 16 may be effected in a counter-clockwise direction.

A variation in the location of the vacuum cylinder which may be used with any of the clutch mechanisms is shown in Fig. 10, in which the engine intake pipe 101 has an opening 32' leading directly through one head 44' into an integral cylinder 102. The opposite end of this cylinder is closed by a head member 103 in which is carried a piston rod 40' connected at one end (not shown) to one of the ratchet actuating members. The other end of the rod 40' carries the piston 41' which moves in the cylinder 102. A spring 43' is positioned in the cylinder 102 between the piston 41' and the head 44'.

The action of this piston is controlled by the spring and the engine intake vacuum in the same manner as previously explained with the added advantage of more rapid response to variations in the vacuum because the cylinder is close to the intake pipe and integral therewith so that there is no chance for infiltration of air which might occur through the connections of the pipe 32 in the other forms shown.

It will thus be seen that we have provided mechanism which will positively and intermittently impart a rotating motion to the movable shaft of a filter applicable to the oil supply line or other liquid system of an internal combustion engine which is operated and controlled by the changes in the vacuum within the intake manifold of the engine whereby the cleaning action of the filter is performed with sufficient frequency under the action of the throttle as normally operated in the control of the engine.

While this invention has been illustrated and described as actuated by changes in the degree of vacuum in the intake manifold, it is obvious that other occasional changes in pressure resulting from the operation of the engine or its accessories might be utilized for the same purpose, by connecting the pipe 32 to any source of fluctuating positive pressure, such as a force feed oil lubricating system, a water circulating system, an hydraulic brake system or an air brake system.

In such cases the pressure would act to move the piston or other actuating member and the clutch in one direction and the spring, suitably positioned and held in opposition thereto, would act to move the piston and turn the clutch in the opposite direction when the pressure falls to a point below the compressive strength of the spring.

The clutch action could be designed to move the shaft when the actuating member is being moved by the pressure and release the shaft when it is returned by the spring or vice versa.

Suction or pressure can be intermittently provided or applied to the conduit 32 by action of the brake pedal so that a cleaning action will take place whenever the brake is actuated. This conduit 32 could also be connected to the water circulating system so that pressure or suction is applied when the circulating pump starts up or stops. Similarly the clutch motor device 26 may be actuated by fluid power supplied for instance from hydraulic power transmission or from what are sometimes called air brake or hydraulic brake systems so that fluctuating pressure will intermittently actuate the clutch and thus clean the filter or supply clean filtering surfaces. While the type of filter herein shown is greatly to be preferred for most cases, it should be understood that other forms of filters may be cleaned automatically as herein described, by rotation of a filtering member with respect to a cleaning member or vice versa, or by moving a clean filter element into position to replace one which has been in use.

We claim:

1. Filter mechanism comprising a rotatable shaft, means actuated by the shaft for causing clean filtering surfaces to be brought into use, a clutch coacting with said shaft to actuate the shaft intermittently, a suction operated device having a movable element connected to the clutch, and means for intermittently applying suction from the intake passage of an internal combustion engine to move the movable element of the suction device and thus actuate the clutch whereby a substantial change in the intake suction causes clean filtering surfaces to be automatically brought into use.

2. A filter for an internal combustion engine comprising a casing with entrance and exit passages for the fluid to be filtered, a set of spaced rotatable filter plates and a set of intervening stationary scraper plates mounted in the casing, a suction chamber associated with the casing and suitably connected to the intake passage of the engine, a spring pressed movable element in the suction chamber, moved back and forth by the alternate suction from the engine and the action of the spring, a shaft mounted in the casing and connected to the filter plates, and clutch mechanism connecting said spring pressed element in the suction chamber and said shaft to intermittently rotate the filter plates upon changes in the suction from the intake passage.

3. A filter for use in connection with an internal combustion engine comprising a casing, a filtering member and a cleaning member within said casing, one of said members being rotatable with respect to the other for the purpose of cleaning the filter, a suction chamber having a suitable connection to the intake passage of the engine, a movable element in the suction chamber, a shaft mounted in the casing and connected to said rotatable member, clutch mechanism connecting said element in the suction chamber and said shaft to rotate said rotatable member in one direction only upon a substantial change in the suction from the intake passage and a spring for moving said element in the opposite direction.

4. An automatic filter for use in connection with an internal combustion engine comprising a filter casing containing a filtering member and a cleaning member, at least one of said members being movable with respect to the other member for the purpose of cleaning the filtering member, clutch mechanism adapted to be connected to the movable member, a suction operated device having a movable element connected to the clutch mechanism and a suitable connection between said device and the intake passage of the engine whereby the filter cleaning action is effected by a substantial change in the suction or vacuum in the intake passage.

5. A filter construction for an internal combustion engine comprising a filter member, a cleaning member, one of said members being rotatable with respect to the other for cleaning the filter member, a casing enclosing the two members and having a head with inlet and outlet passages for the fluid to be filtered, a suction operated device mounted on said head outside the casing, a shaft carried in said head connected to said rotatable member, a clutch mechanism adapted to turn said shaft in one direction only, a spring actuated movable element in said device connected to said clutch mechanism and means for connecting said device with the intake passage of the engine.

6. A filter construction for an internal combustion engine comprising a filter member, a cleaning member, one of said members being rotatable with respect to the other for cleaning the filter member, a casing including a head and enclosing the two members and having inlet and outlet passages for the liquid to be filtered, a suction operated device mounted on said casing, a shaft carried in said head connected to said rotatable member, a clutch mechanism adapted to turn said shaft in one direction only, a movable element in said device connected to said clutch mechanism and means for connecting said device with the intake passage of the engine.

7. Actuating mechanism for a filter for use in conjunction with a source of power comprising clutch mechanism adapted to be connected to a movable part of the filter, a suction operated device having a spring pressed movable element connected to the clutch mechanism and means connecting said device with a source of suction responsive to changes in the operation of said source of power, whereby the presentation of clean filter surfaces is effected by substantial changes in said source of suction.

CHARLES H. CUNO.
PHILIP E. ASHTON.